(12) United States Patent
Phadke (10) Patent No.: US 10,657,472 B2
(45) Date of Patent: May 19, 2020

(54) IT SERVICES INTEGRATED WORK MANAGEMENT

(71) Applicant: INTERNATIONAL BUSINESS MACHINES CORPORATION, Armonk, NY (US)

(72) Inventor: Sameer G. Phadke, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 14/819,699

(22) Filed: Aug. 6, 2015

(65) Prior Publication Data

US 2017/0039506 A1 Feb. 9, 2017

(51) Int. Cl.
*G06Q 10/06* (2012.01)

(52) U.S. Cl.
CPC . *G06Q 10/063118* (2013.01); *G06Q 10/0633* (2013.01); *G06Q 10/063112* (2013.01)

(58) Field of Classification Search
USPC ........................................................ 705/7.14
See application file for complete search history.

(56) References Cited

U.S. PATENT DOCUMENTS

| | | | | |
|---|---|---|---|---|
| 5,467,268 A * | 11/1995 | Sisley | ..................... | G06Q 10/06 705/7.16 |
| 6,895,382 B1 * | 5/2005 | Srinivasan | ..... | G06Q 10/063118 705/7.17 |
| 8,566,459 B2 | 10/2013 | Dehaan et al. | | |
| 8,850,387 B2 | 9/2014 | Alabiso | | |
| 2003/0120509 A1 * | 6/2003 | Bruch | ..................... | G06Q 10/02 705/307 |
| 2003/0195757 A1 * | 10/2003 | Greenstein | ......... | G06Q 10/0631 705/1.1 |
| 2008/0312980 A1 * | 12/2008 | Boulineau | .............. | G06Q 10/06 705/7.13 |

(Continued)

OTHER PUBLICATIONS

IOffice; Integrated Workplace Management System (iwms); retrieved from the Internet URL: http://www.iofficecorp.com/integrated-workplace-management-system; retrieved on Feb. 6, 2015; 6 pages.

(Continued)

*Primary Examiner* — Folashade Anderson
(74) *Attorney, Agent, or Firm* — Schmeiser, Olsen & Watts; Mark C. Vallone (57) ABSTRACT

A method and system for work management with respect to delivery of IT services is provided. The method includes identifying via a plurality of integrated computer sensor devices within a work management computing system, work types associated with computer based work functions executed by multiple work execution computing systems connected to a work management computing system. Specified work functions of the computer based work functions are defined and multiple interfaces connected between the multiple work execution computing systems and the work management computing system are identified. Groups of the specified work functions are consolidated based on associated work types and each group is modified based on update data. Resources associated with execution of each group are optimized and resource staffing plan associated with resources is generated.

18 Claims, 6 Drawing Sheets

(56) References Cited

U.S. PATENT DOCUMENTS

| | | | |
|---|---|---|---|
| 2010/0023921 A1* | 1/2010 | Chaar | G06F 8/20 |
| | | | 717/102 |
| 2013/0290063 A1* | 10/2013 | Gonzalez Diaz | G06Q 10/06 |
| | | | 705/7.25 |
| 2014/0058801 A1* | 2/2014 | Deodhar | G06Q 10/0639 |
| | | | 705/7.38 |
| 2014/0244329 A1* | 8/2014 | Urban | G06Q 10/063114 |
| | | | 705/7.15 |
| 2018/0115552 A1* | 4/2018 | Kantubukta | H04L 63/10 |
| 2018/0173216 A1* | 6/2018 | Spiro | G06Q 10/06 |

OTHER PUBLICATIONS

Runcie, Tim et al.; Microsoft Project Server 2010 Integration with SAP; Microsoft; Jan. 2012; 30 pages.

Connect Your Favorite Tools With Harvest; retrieved from the Internet URL https://www.getharvest.com/add-ons; retrieved on Feb. 6, 2015; 2 pages.

\* cited by examiner

| TimeSheet Entry | | | | | | | | |
|---|---|---|---|---|---|---|---|---|
| | | | | Date 01/31/2013 | | Refresh Work Items | | |
| ID | Health | Ref. No. | Summary | Present State | Modified State | Today | Health Comments | Work Comments |
| 67945 | Unassig... | NA | test case preparation 67945 - Rev... | New | New | 00:00 | | |
| 70922 | Unassig... | NA | task 70922 - Test WI 0001 | Open | none | 00:00 | | |
| 72963 | Unassig... | NA | task 72963 - Test CurrentWeek -02 | Open | none | 00:00 | | |
| 72965 | Unassig... | NA | task 72965 - Test w-1 -02 | Open | Open | 00:00 | | |

Note: Please click on Refresh Work Items to get data from RTC

Update Time to RTC

IT SERVICES INTEGRATED WORK MANAGEMENT

FIELD

The present invention relates generally to a method for managing information technology (IT) services and in particular to a method and associated system for performing integrated work management with respect to various elements of effort by diversified or distributed teams in order to fulfil obligations of providing IT services under a complex service engagement.

BACKGROUND

Integrating framework for managing services may include a complicated process that may be time consuming and require a large amount of resources. Additionally, a typical IT services engagement requires various types of work elements and tasks being executed. The tasks comprise differing tasks, lifecycles, phases, and attributes. The tasks are traditionally tracked in specifically designed tools tailored from the perspective of consumers of the service. A typical management system does not include the ability to operate within a common structure and therefore is unable to generate statuses with respect to the framework. Accordingly, there exists a need in the art to overcome at least some of the deficiencies and limitations described herein above.

SUMMARY

A first aspect of the invention provides an IT services based integrated work management method comprising: identifying, by a computer processor of a work management computing system, work types associated with a plurality of computer based work functions executed by multiple work execution computing systems connected to the work management computing system; defining within the work management system, by the computer processor, specified work functions of the plurality of computer based work functions; identifying, by the computer processor, multiple interfaces connected between the multiple work execution computing systems and the work management computing system, wherein the multiple interfaces enable access to the multiple work execution computing systems and the work management computing system; consolidating, by the computer processor, groups of the specified work functions based on associated work types, work groups, or competencies related to work elements; modifying, by the computer processor based on update data, each group of the groups of the specified work functions; optimizing, by the computing system, resources associated with execution of each the group; and generating, by the computer processor based on results of the optimizing, a resource staffing plan associated with the resources.

A second aspect of the invention provides a work management computing system comprising a computer processor coupled to a computer-readable memory unit, the memory unit comprising instructions that when executed by the computer processor implements an IT services based integrated work management method comprising: identifying, by the computer processor, work types associated with a plurality of computer based work functions executed by multiple work execution computing systems connected to the work management computing system; defining within the work management system, by the computer processor, specified work functions of the plurality of computer based work functions; identifying, by the computer processor, multiple interfaces connected between the multiple work execution computing systems and the work management computing system, wherein the multiple interfaces enable access to the multiple work execution computing systems and the work management computing system; consolidating, by the computer processor, groups of the specified work functions based on associated work types, work groups, or competencies related to work elements; modifying, by the computer processor based on update data, each group of the groups of the specified work functions; optimizing, by the computing system, resources associated with execution of each the group; and generating, by the computer processor based on results of the optimizing, a resource staffing plan associated with the resources.

A third aspect of the invention provides a computer program product, comprising a computer readable hardware storage device storing a computer readable program code, the computer readable program code comprising an algorithm that when executed by a computer processor of a work management computing system implements an IT services based integrated work management method comprising: identifying, by the computer processor, work types associated with a plurality of computer based work functions executed by multiple work execution computing systems connected to the work management computing system; defining within the work management system, by the computer processor, specified work functions of the plurality of computer based work functions; identifying, by the computer processor, multiple interfaces connected between the multiple work execution computing systems and the work management computing system, wherein the multiple interfaces enable access to the multiple work execution computing systems and the work management computing system; consolidating, by the computer processor, groups of the specified work functions based on associated work types, work groups, or competencies related to work elements; modifying, by the computer processor based on update data, each group of the groups of the specified work functions; optimizing, by the computing system, resources associated with execution of each the group; and generating, by the computer processor based on results of the optimizing, a resource staffing plan associated with the resources.

The present invention advantageously provides a simple method and associated system capable of integrating framework for managing services.

DETAILED DESCRIPTION

Figure 1:
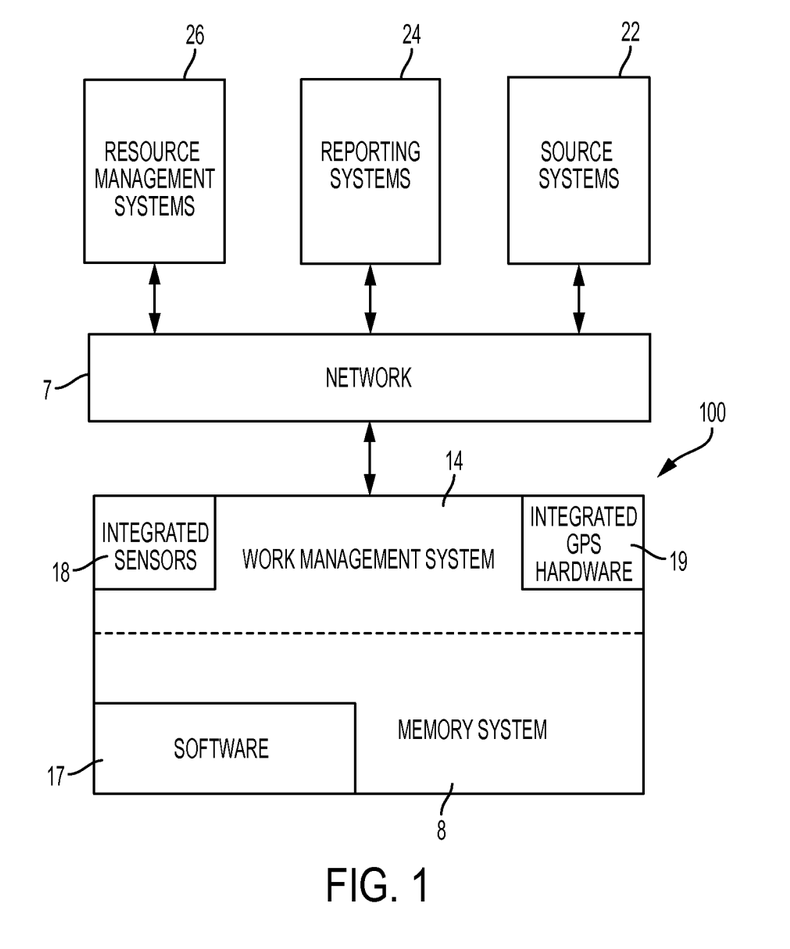
FIG. 1 illustrates a monitoring system for enabling a process for performing integrated work management with respect to IT services, in accordance with embodiments of the present invention.

FIG. 1 illustrates a monitoring system 100 for enabling a process for performing integrated work management with respect to IT services, in accordance with embodiments of the present invention. System 100 provides a single work management platform for managing different types of IT service functions performed with respect to different source systems.
System 100:
1. Allows each work type to follow an associated lifecycle within an associated lifecycle tool.
2. Tracks work statuses, efforts, and costs (with respect to each work type) into a single work management platform for monitoring and providing feedback to source systems based on specific needs regarding a specified type of work. System 100 enables a process for identifying work types, defining work items, and identifying interfaces.

System 100 of FIG. 1 includes integrations with resource management systems 26, reporting systems 24, and source systems 22 connected through a network 7 to a work management system 14. Work management system 14 comprises internal integrated sensors 18, internal integrated GPS hardware 19, a built in software component 17, and a memory system 8. Each of resource management systems 26, reporting systems 24, source systems 22, and work management system 14 may comprise or be comprised by an embedded controller. An embedded controller is defined herein as a computing system comprising a dedicated functionality that enables various system tasks that an operating system does not handle. An embedded controller may include specific internal dedicated hardware such as a microcontroller (a CPU comprising integrated memory and peripherals), internal integrated sensors 18 (i.e., dedicated monitoring hardware), and internal integrated global positioning system (GPS) hardware 19. Additionally, embedded controller may include its own RAM and flash ROM for its own internal software. Memory system 8 may include a single memory system. Alternatively, memory system 8 may include a plurality of memory systems. Memory system 8 includes built in software component 17. Built in software component 17 in combination with the integrated sensors 18 and GPS hardware 19 may enable work management system 14 to perform integrated work management with respect to IT services. Network 7 may include any type of network including, inter alia, a local area network, (LAN), a wide area network (WAN), the Internet, a wireless network, etc. System 100 consolidates all work to be performed via source systems 22 into a single work management platform by performing an identification process according to pre-configured identification logic, a definition process, and an interfacing process.

Figure 2:
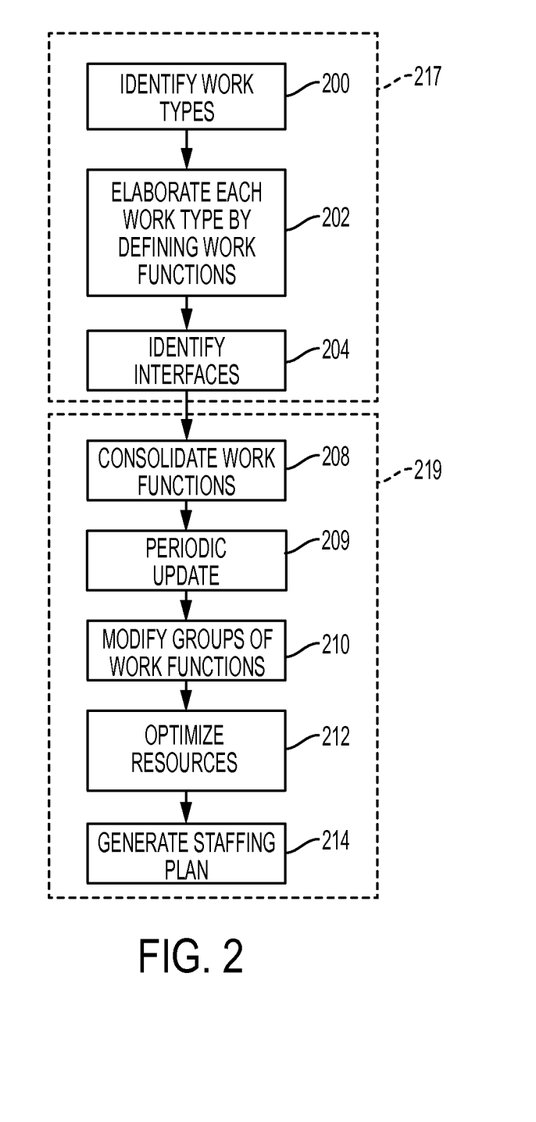
FIG. 2 illustrates an algorithm detailing a process flow enabled by the system of FIG. 1 for deploying and enabling a process for performing integrated work management with respect to IT services, in accordance with embodiments of the present invention.

FIG. 2 illustrates an algorithm detailing a process flow enabled by system 100 of FIG. 1 for deploying and enabling a process for performing integrated work management with respect to IT services, in accordance with embodiments of the present invention. The overall process illustrated in the algorithm of FIG. 2 comprises two elements: a configuration process (i.e., process step 217) and an operation process (i.e., process step 219).

Process step 217 (comprising steps 200, 202, and 204) enables a process for configuring a work management system including identifying work types, elaboration of the work types, and defining interfaces.

Process step 219 (comprising steps 208, 210, 212, and 214) enables a process for operating a work management system including consolidating work functions, updating statuses, modifying the work functions by groups and competencies, planning and optimizing resources, and generating staffing plans.

The identification process includes identifying: all work types comprised by a specified engagement such that a source system, associated lifecycle, and associated attributes defined in an associated source system are identified for each work type. Additionally, all work types (i.e., not tracked in any tool/system), a work management system of records, and distinct work areas (e.g., projects, business units, etc.) for a work management system are identified.

The definition process includes defining: corresponding work items in a work management system, attributes applicable to the individual work item types requiring replication with source systems, and a work management life cycle for each work type.

The interface identification process includes identifying and implementing: automated inbound interfaces from various source systems and outbound statuses or data updates from the work management system into the source systems.

In step 200, work types associated with computer based work functions executed by multiple work execution computing systems connected to a work management computing system are identified. The work types may be identified via integrated computer sensor devices and integrated GPS hardware. The identification process may include: identifying a source system and lifecycle associated with each work type; identifying a group of work types that are not tracked in any tool; and identifying distinct work areas (within the work management computing system) associated with each work type. The work areas may be associated with a specific group of human or non-human resources, specific competencies, or organizational units in the service provider organization. In step 202, each of the work type identified in step 200 is elaborated by specifying various work functions (or elements). Defining the specified work functions may include: defining attributes associated with each work type requiring replication; and defining a work management lifecycle for each work type. In step 204, multiple interfaces connected between the work execution computing systems and the work management computing system are identified. The multiple interfaces enable access to the work execution computing systems and the work management computing system. Identifying the multiple interfaces may include: enabling automated inbound interfaces associated with source systems; enabling data updates associated with the source systems; and generating mechanisms associated with updating the specified work functions. In step 208, groups of the specified work functions are consolidated based on associated work types. The consolidation process may include: managing the groups of said specified work functions with respect to specified work areas based on skill and competence levels of a plurality of individuals. Step 209 involves regular or periodic updating of actual work statuses of each of the work elements identified in step 202 and consolidated in step 208 by individual workgroups or competencies in a consolidated manner. In step 210, each group of the specified work functions is modified based on update data. Modifying each group may include receiving updates associated with the specified work functions. In step 212, resources associated with execution of each group of the specified work functions are optimized. The optimization process may include: calculating allocations associated with each group; calculating consolidated resource and utilization bandwidth associated with work areas of each group; and generating forecasts associated with the work areas. In step 214, a resource staffing plan associated with the resources is generated based on results of the optimizing of step 212.

Figure 3:
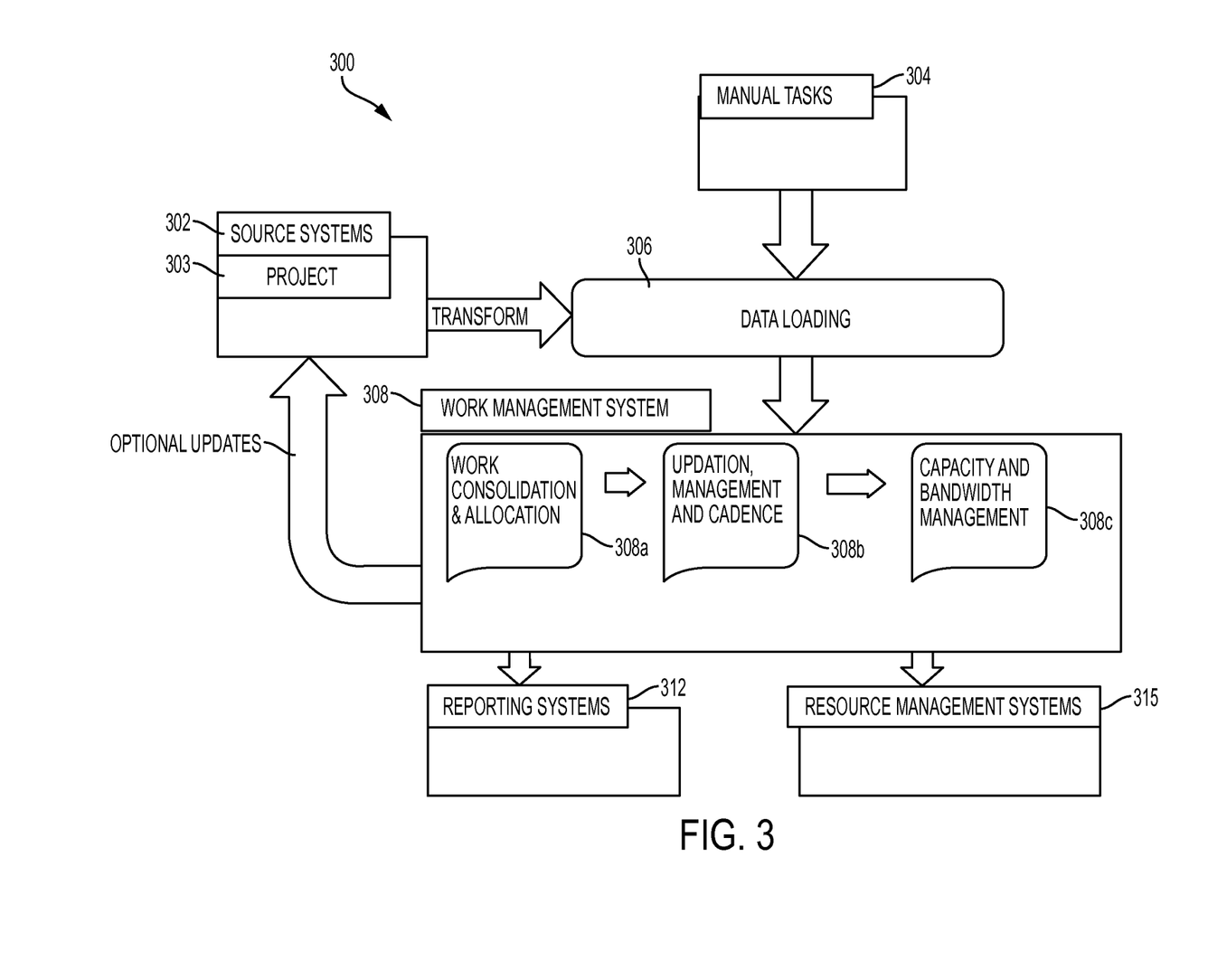
FIG. 3 illustrates a block diagram detailing a process flow enabled by the system of FIG. 1 for performing integrated work management with respect to IT services, in accordance with embodiments of the present invention.

FIG. 3 illustrates a block diagram 300 detailing a process flow enabled by system 100 of FIG. 1 for performing integrated work management with respect to IT services, in accordance with embodiments of the present invention. Output data from source systems 302 is transformed and transmitted to a data loading component. The output data from the source systems 302 may include incident management data, problem management data, change management data, and project scheduling data. Source systems 302 may include a software company specific project 303 for integration. Additionally, a manual task component 304 transfers manual tasks data to the data loading component 306. The manual tasks data may include monitoring tasks, repetitive tasks, and preventative maintenance tasks. The output data from the source systems 302 and the manual tasks data are transferred from the data loading component 306 to a work management system 308. The work management system comprises a work consolidation and allocation component 308a, an updating, management, and cadence component 308b, and a capacity and bandwidth management component 308c. The work consolidation and allocation component 308a may perform the following functions: Consolidation and allocation of all work based on a skill and competence level and management of individual work with respect to specified work areas. The updating, management, and cadence component 308b may perform the following functions: management of status and effort updates from work teams with respect to the work management system; management of cadence requirements; and management of delivery KPIs. The bandwidth management component 308c may perform the following functions: calculation of current work allocations; calculation of consolidated resource and bandwidth utilization across work areas; creation of forecasts for defined planning horizons across work areas and assignments; and optimization of resource plans. All data results from work management system are transmitted to reporting systems 312 and resource management systems 315. Reporting systems 312 are enabled to generate compliance reports. Resource management systems 315 are enabled to generate resource staffing plans. The process flow of FIG. 3 enables the following functionality:
1. Consolidation of all types of work involved in IT service delivery with respect to work management.
2. Allowing each work type to follow its own lifecycle within its own lifecycle tool thereby allowing each customer organization enable a seamless delivery process without any change to existing processes or tools.
3. Allowing effective tuning of service delivery to a customer or engagement KPI.
4. Allowing effective usage of resources and optimization at an integrated level.

Figure 4A:
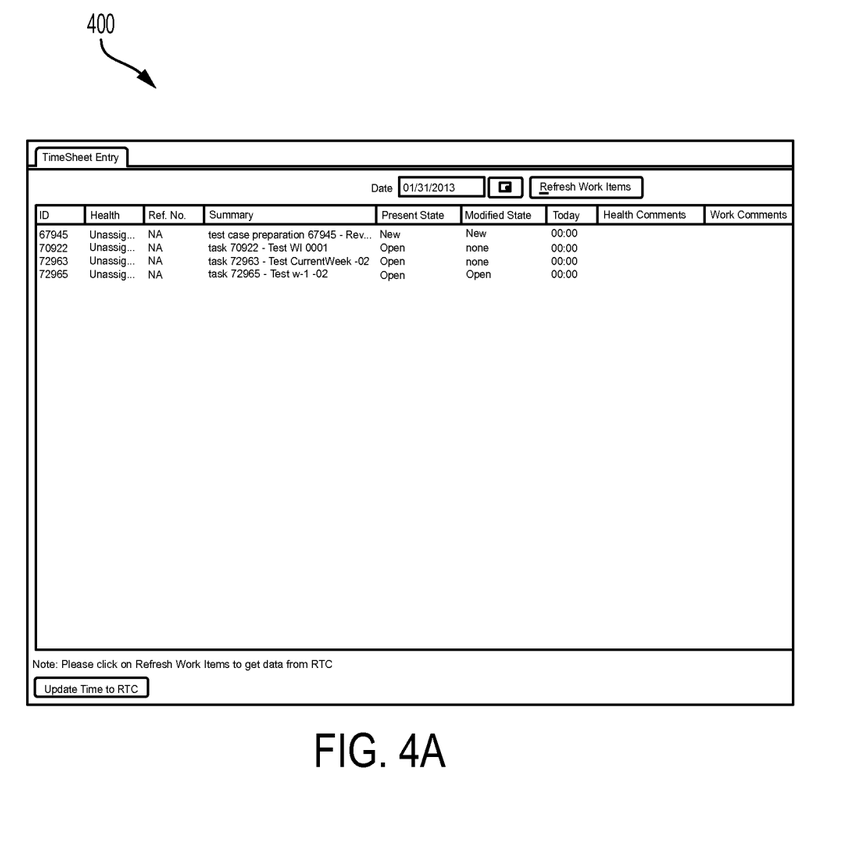
FIGS. 4A-4C illustrate screen shots of a tool development process, in accordance with embodiments of the present invention.

FIG. 4A illustrates a first screen shot 400 of a tool development process, in accordance with embodiments of the present invention. First screen shot 400 illustrates a sample execution of steps 308a and 308b of FIG. 3 with respect to an actual implemented computer program. First screen shot 400 comprises a convenient method for updating and cadence of work functions retrieved from various work types and consolidated for a specific individual or a specific workgroup. For example, when an individual connects to the product, the system displays a consolidation of all work elements from all source systems that the individual or the workgroup is expected to work on and allows statuses of the work elements to be updated.

Figure 4B:
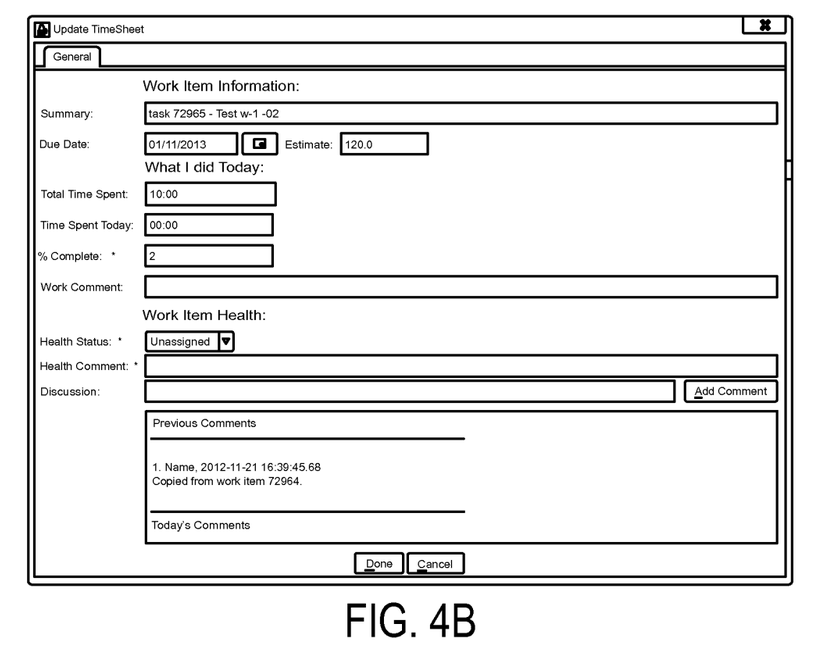

FIG. 4B illustrates a second screen shot 402 of a tool development process, in accordance with embodiments of the present invention. Second screen shot 402 illustrates a sample execution illustrating how a specific work element status may be updated according to an elaborated definition.

Figure 4C:
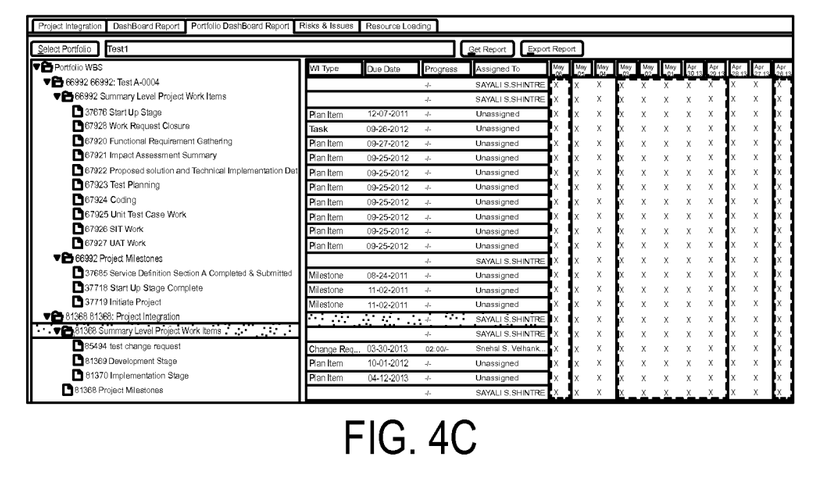

FIG. 4C illustrates a third screen shot 408 of a tool development process, in accordance with embodiments of the present invention. Third screen shot 408 illustrates progress of all work elements from any specific source system (e.g., a development project sourced from a company project source system) updated by diverse workgroups or individuals and presented in a form of a monthly cadence and management report. The report illustrates a portfolio of different projects, and the statuses of individual work elements as updated in FIGS. 4A and 4B.

Figure 5:
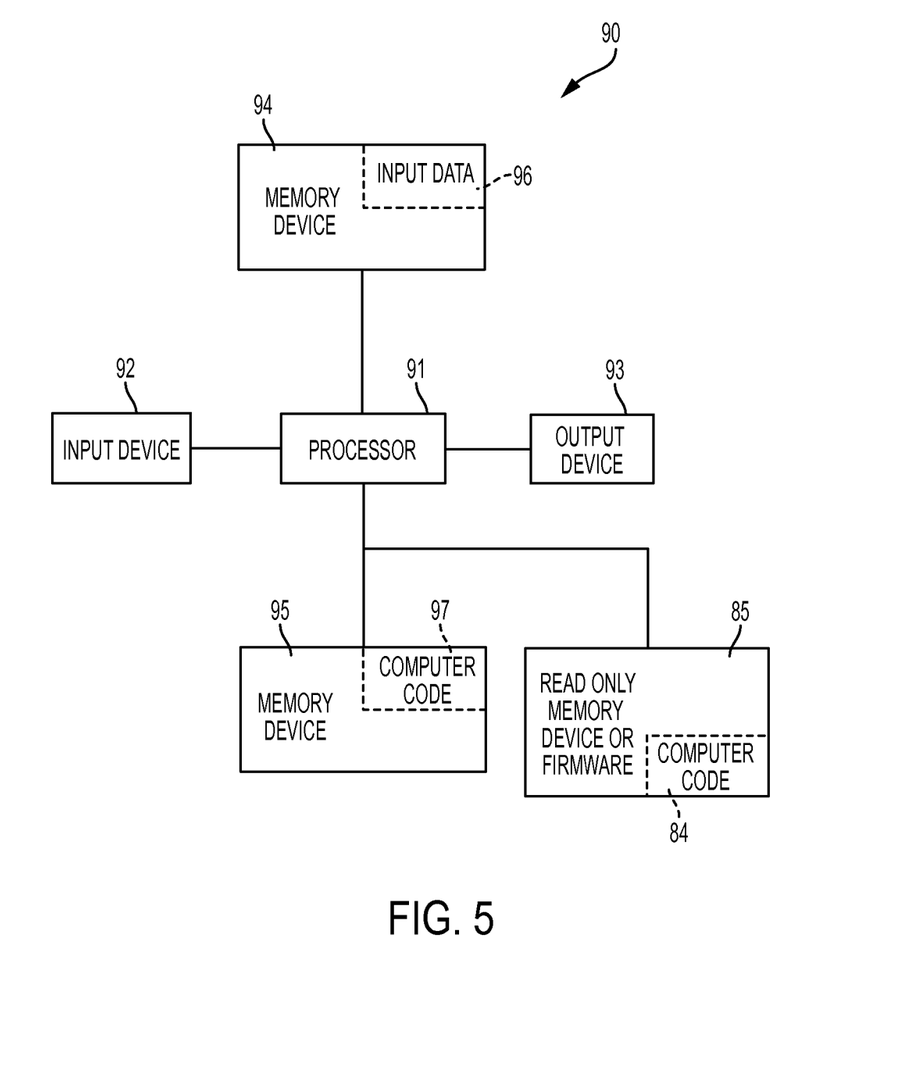
FIG. 5 illustrates a computer system used by the system of FIG. 1 for enabling a process for performing integrated

FIG. 5 illustrates a computer system 90 (e.g., work management system 14 of FIG. 1) used by or comprised by the system of FIG. 1 for enabling a process for performing integrated work management with respect to IT services, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for performing integrated work management with respect to IT services. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to perform integrated work management with respect to IT services. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for performing integrated work management with respect to IT services. In another embodiment, the invention provides a business method that performs the process steps of the invention on a subscription, advertising, and/or fee basis. That is, a service supplier, such as a Solution Integrator, could offer to enable a process for performing integrated work management with respect to IT services. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An information technology (IT) services based integrated work management method comprising:
identifying, by a computer processor of a work management computing system via integrated computer sensor devices, work types associated with a plurality of computer and non-human resource based work functions executed by multiple work execution computing systems connected to said work management computing system;
defining within said work management system, by said computer processor, specified work functions of said plurality of computer and non-human resource-based based work functions;
identifying, by said computer processor, multiple interfaces connected between said multiple work execution computing systems and said work management computing system, wherein said multiple interfaces enable access to said multiple work execution computing systems and said work management computing system;
enabling, by said processor, system tasks of said work management computing system without assistance from an operating system of said work management computing system;
transferring, by said processor from said multiple work execution computing systems, monitoring tasks and preventative maintenance tasks for said multiple work execution computing systems;
consolidating, by said computer processor, groups of said specified work functions with respect to said monitoring tasks and preventative maintenance tasks and based on associated work types, work groups, or competencies related to work elements;
modifying, by said computer processor based on update data, each group of said groups of said specified work functions;
optimizing, by said computing system, staffing resources associated with execution of each said group by:
calculating allocations associated with each said group;
determining consolidated non-human resource capacity and utilization bandwidth associated with computer implemented work areas of each said group; and
generating forecasts associated with said computer implemented work areas; and
generating, by said computer processor based on results of said optimizing, a resource staffing plan associated with said staffing resources.

2. The method of claim 1, wherein said identifying said work types comprises:
identifying a source system and lifecycle associated with each work type of said work types;
identifying a group of work types of said work types that are not track in any tool; and
identifying distinct work areas, within said work management computing system, associated with each said work type.

3. The method of claim 1, wherein said defining said specified work functions comprises:
defining attributes associated with each work type of said work types requiring replication; and
defining a work management lifecycle for each said work type.

4. The method of claim 1, wherein said identifying said multiple interfaces comprises:
enabling automated inbound interfaces associated with source systems;
enabling data updates associated with said source systems; and
generating mechanisms associated with updating said specified work functions.

5. The method of claim 1, wherein said consolidating said groups of said specified work functions comprises:
managing based on skill and competence levels of a plurality of individuals, said groups of said specified work functions with respect to specified work areas.

6. The method of claim 1, wherein said modifying each said group comprises:
receiving updates associated with said specified work functions.

7. The method of claim 1, wherein said work management computing further comprises integrated global positioning system (GPS) hardware, and wherein said identifying is further performed via said integrated GPS hardware.

8. The method of claim 1, further comprising:
providing at least one support service for at least one of creating, integrating, hosting, maintaining, and deploying computer-readable code in the computing system, said code being executed by the computer processor to implement: said identifying said work types, said defining, said identifying said multiple interfaces, said consolidating, said modifying, said optimizing, and said generating.

9. A work management computing system comprising a computer processor coupled to a computer-readable memory unit, said memory unit comprising instructions that when executed by the computer processor implements an information technology (IT) services based integrated work management method comprising:

identifying, by said computer processor via integrated computer sensor devices, work types associated with a plurality of computer and non-human resource based work functions executed by multiple work execution computing systems connected to said work management computing system;

defining within said work management system, by said computer processor, specified work functions of said plurality of computer and non-human resource-based based work functions;

identifying, by said computer processor, multiple interfaces connected between said multiple work execution computing systems and said work management computing system, wherein said multiple interfaces enable access to said multiple work execution computing systems and said work management computing system;

enabling, by said processor, system tasks of said work management computing system without assistance from an operating system of said work management computing system;

transferring, by said processor from said multiple work execution computing systems, monitoring tasks and preventative maintenance tasks for said multiple work execution computing systems;

consolidating, by said computer processor, groups of said specified work functions with respect to said monitoring tasks and preventative maintenance tasks and based on associated work types, work groups, or competencies related to work elements;

modifying, by said computer processor based on update data, each group of said groups of said specified work functions;

optimizing, by said computing system, staffing resources associated with execution of each said group by:
        calculating allocations associated with each said group;
        determining consolidated non-human resource capacity and utilization bandwidth associated with computer implemented work areas of each said group; and
        generating forecasts associated with said computer implemented work areas; and     generating, by said computer processor based on results of said optimizing, a resource staffing plan associated with said staffing resources.

10. The work management computing system of claim 9, wherein said identifying said work types comprises:

identifying a source system and lifecycle associated with each work type of said work types;

identifying a group of work types of said work types that are not track in any tool; and     identifying distinct work areas, within said work management computing system, associated with each said work type.

11. The work management computing system of claim 9, wherein said defining said specified work functions comprises:

defining attributes associated with each work type of said work types requiring replication; and     defining a work management lifecycle for each said work type.

12. The work management computing system of claim 9, wherein said identifying said multiple interfaces comprises:

enabling automated inbound interfaces associated with source systems;

enabling data updates associated with said source systems; and     generating mechanisms associated with updating said specified work functions.

13. The work management computing system of claim 9, wherein said consolidating said groups of said specified work functions comprises:

managing based on skill and competence levels of a plurality of individuals, said groups of said specified work functions with respect to specified work areas.

14. The work management computing system of claim 9, wherein said modifying each said group comprises:

receiving updates associated with said specified work functions.

15. The work management computing system of claim 9, wherein said work management computing further comprises integrated global positioning system (GPS) hardware, and wherein said identifying is further performed via said integrated GPS hardware.

16. A computer program product, comprising a computer readable hardware storage device storing a computer readable program code, said computer readable program code comprising an algorithm that when executed by a computer processor of a work management computing system implements an information technology (IT) services based integrated work management method comprising:

identifying, by said computer processor via integrated computer sensor devices, work types associated with a plurality of computer and non-human resource based work functions executed by multiple work execution computing systems connected to said work management computing system;

defining within said work management system, by said computer processor, specified work functions of said plurality of computer and non-human resource-based based work functions;

identifying, by said computer processor, multiple interfaces connected between said multiple work execution computing systems and said work management computing system, wherein said multiple interfaces enable access to said multiple work execution computing systems and said work management computing system;

enabling, by said processor, system tasks of said work management computing system without assistance from an operating system of said work management computing system;

transferring, by said processor from said multiple work execution computing systems, monitoring tasks and preventative maintenance tasks for said multiple work execution computing systems;

consolidating, by said computer processor, groups of said specified work functions with respect to said monitoring tasks and preventative maintenance tasks and based on associated work types, work groups, or competencies related to work elements;

modifying, by said computer processor based on update data, each group of said groups of said specified work functions;

optimizing, by said computing system, staffing resources associated with execution of each said group by:
        calculating allocations associated with each said group;
        determining consolidated non-human resource capacity and utilization bandwidth associated with computer implemented work areas of each said group; and
        generating forecasts associated with said computer implemented work areas; and generating, by said computer processor based on results of said optimizing, a resource staffing plan associated with said staffing resources.

17. The computer program product of claim 16, wherein said identifying said work types comprises:
   identifying a source system and lifecycle associated with each work type of said work types;
   identifying a group of work types of said work types that are not track in any tool; and
   identifying distinct work areas, within said work management computing system, associated with each said work type.

18. The computer program product of claim 16, wherein said defining said specified work functions comprises:
   defining attributes associated with each work type of said work types requiring replication; and
   defining a work management lifecycle for each said work type.

* * * * *